Patented Aug. 8, 1939

2,168,926

UNITED STATES PATENT OFFICE 2,168,926

EGG WHITE PROCESS

Verne D. Littlefield, Beverly Hills, Calif., assignor to Armour and Company, Chicago, Ill., a corporation of Illinois No Drawing. Application July 7, 1938,
Serial No. 218,019

10 Claims. (Cl. 99—210)

This invention relates to egg white processes, and it comprises processes wherein raw egg whites, or thawed frozen egg whites, or the separated thick and thin portions of egg whites are acidified to pH values lying between about 4 and 6, the egg whites separated from the flocculent insoluble mass thus formed therein, and the egg whites then allowed to ferment to give a product which, upon drying, has superior foam-forming characteristics.

Egg whites are composed of an aqueous solution, which is most probably colloidal, of egg albumin in a complex system with other proteins. Although a freshly obtained egg white can be whipped to form satisfactory foams for incorporation in edible products, it is an observed fact that the product of drying such an egg white without some treatment will not, upon reconstitution with water, yield a satisfactory foam. The foaming characteristics, or so-called "whip" of an egg white can be measured by reference to the volume of foam obtained and the stability of the foam. Standardized methods have been developed for comparing dried egg whites in these respects. Not only should a dried egg white, upon reconstitution with water, yield a voluminous foam, the foam itself should be relatively stable and tough and not display water-leakage or so-called "weeping".

These desirable characteristics in a dried egg white have hitherto been obtained by chemically treating the liquid egg white prior to the drying operation. Such chemical processes are of two kinds. In the first, the egg whites are allowed to ferment in large vats. During the fermentation a frothy scum collects on the top of the layer of egg white and after about 72 to 96 hours the egg white is decanted from beneath the scum and dried. The egg white can be neutralized before drying. The fermentation process has a number of disadvantages, chief among them being the fact that the dried product has a distinct odor indicative of bacteriological putrefaction.

The prior art describes many different ways of facilitating the fermentation type of process. For example, the raw egg whites have been acidified to speed up the fermentation reaction and the acidified whites held at a fermentation temperature for many hours. Thereafter the clarified and liquified egg whites are withdrawn from the scum of insoluble material collected on the top of the body of liquid egg white. In this combination acid and fermentation process, objectionable odor in the final product is inevitable regardless of the presence of the acid.

In still other broadly old processes the egg whites have been acidified with hydrochloric acid or other acid customarily used in the art, and the thus liquified egg whites dried as promptly as possible prior to any fermentation. The acidified egg whites can be neutralized before drying. While the strictly acid, non-fermentation process will give an egg white product substantially free of odor, it is an observed fact that such an egg white product does not whip very well. However, in my co-pending application, Serial No. 158,430, I have described improvements in the acid, non-fermentation type of process whereby I am able to retain in the dried egg white certain foam-stabilizing agents normally occurring in the white but precipitated out when prior art acidification processes are used. In substance, the inventive concept in the said co-pending application resides in acidifying the liquid whites to pH values between 5.5 and 5.8, separating any flocculated sludge from the body of egg white and then drying the egg white, all steps being conducted under conditions which definitely avoid any possibility of fermentation.

Dried egg whites made in accordance with the aforesaid application are entirely free of any obnoxious odor, but it is desirable to permit the dried whites to age in order to enhance their whipping characteristics.

Thus, on the one hand, a fermented egg white has desirable whipping characteristics immediately after drying but possesses obnoxious odor and high bacterial count, and an acidified, non-fermentation type of product is substantially odorless and has a low bacterial count but requires a period of aging for best results.

Hitherto no one has been able to gain the benefits and advantages of both types of processes without introducing the undesirable characteristics inherent in the products thereof. In the present invention I have set myself to the problem of preparing a dried egg white which has superior whipping characteristics immediately after drying, or after a very much shortened aging period on comparison with egg whites hitherto prepared, but which is completely free of any of those undesirable properties characteristic of a fermented egg white.

My invention is based on the discovery that the obnoxious fermentation odor in a fermented egg white is due in large measure to the fact that the egg whites continue to ferment in the presence of solid insoluble material on which the bacteria are living. What happens during the fermentation of an egg white in the conventional manner can possibly be explained as follows. When the egg whites are acidified to facilitate the fermentation reaction, and then held for a period of many hours, insoluble portions are first precipitated or thrown out of solution. These are materials which are insoluble in egg white having the pH value imparted by the acid. During the subsequent fermentation, which is actually in the nature of a biological hydrolysis, these insoluble proteins are acted upon and apparently undergo breakdown in a way which develops odor-forming materials. They also act as a solid media for the growth of the bacteria. The same is true whether or not the egg whites are acidified prior to fermentation. If no acid is added the fermentation reaction itself results in the formation of acids, chiefly lactic, so that proteins become insoluble and undergo biological splitting in substantially the same manner.

Consequently, my discoveries have shown that the odor in a fermented egg white appears to be the result of changes taking place in those proteins which have been rendered insoluble by virtue of the acidity of the egg white.

And I have discovered that the advantageous properties with respect to whipping which are present in a fermented egg white product can be realized provided the egg whites are processed in such a manner that fermentation is not allowed to proceed therein until proteins insoluble at the pH of the egg white have been removed. Thus, in board aspects, my invention comprises the following steps. I first acidify the egg whites to a pH of between about 4 and 6. Advantageously this pH lies between 5.5 and 5.8 since in this way I retain within the egg white certain foam-stabilizing agents which would be precipitated out at values below 5.5. The process of the present invention is broader than this, however, since its benefits are realized even if the egg white is acidified to a pH of 4. During and after acidification proteins insoluble at pH values of between 5 and 6 begin to flocculate. I conduct the acidification under such conditions that substantially no fermentation will occur. After flocculation is substantially complete I then separate the clarified egg whites from the flocculent material, and then allow these clarified whites to undergo fermentation. Thus, the principle of my invention is the separation from the whites prior to fermentation of those insoluble proteins which, if allowed to remain in the whites during fermentation, would develop obnoxious odor. Since the bacteria are mostly concentrated on the insoluble material removal of the latter removes the bacteria as well.

My invention can be applied to ordinary egg whites as freshly broken from the shell, to such ordinary egg whites after straining to remove bits of shell, chalazae and stringy portions, to thawed frozen egg whites, and to either the thick or thin portions of the egg whites alone.

In the interest of bravity I shall describe my invention with specific reference to the treatment of ordinary egg whites.

After the eggs have been broken and the whites separated from the yolk the whites are advantageously strained through a strainer to free them of chalazae and shell. The egg whites are then collected in a large vat. Temperature is not a criterion at this stage of my process nor during the following acid treatment because the duration of the treatment is such that little or no opportunity is given for fermentation. Frequently the whites are collected at temperatures as low as 40° F. At this temperature there is substantially on tendency for fermentation to occur. But I can operate at temperatures as high as 135° F. or just below the coagulation point provided the warm, clarified egg whites are separated from the sludge of flocculated insolubles before any substantial fermentation occurs.

To the egg whites I then add enough hydrochloric acid solution of the strength customarily used, about 10%, to acidify the whites to a pH of between about 4 and 6. As stated above, a pH of 5.5 to 5.8 is especially advantageous. The acid causes the flocculation of proteins rendered insoluble at this pH value. Flocculation can be allowed to proceed for a period of about three to ten hours if the whites are at 50° F. and then the treated egg whites are decanted. Most of the flocculent material has meanwhile separated as a sludge at the bottom of the vat. Under these conditions substantially no fermentation will occur. If, on the other hand, I operate on warmed egg whites the action of the acid is very much faster and the flocculent material settles much quicker because of a reduced viscosity in the egg white at the elevated temperature. At moderately elevated temperatures, from room temperature to 140° F., the insoluble proteins can be precipitated and the clarified whites removed therefrom in a short enough period of time to substantially prevent any fermentation. Acidification of the egg whites at temperatures of 100° F. to 140° F. is more specifically described and claimed in the Littlefield and Fischer application, Serial No. 219,280, filed July 14, 1938.

At this stage of the process I have obtained a clarified and liquified egg white substantially free of all proteins insoluble at the pH values stated and in which substantially no fermentation has occurred.

I next transfer the clarified whites to another large vat where they are allowed to undergo fermentation. This fermentation can be bacteriological or enzymatic and can be facilitated by the deliberate addition of ferments to the vat. The prior art is replete with fermenting agents useful for fermenting egg whites and any of these expedients can be used. Alternatively the egg whites can be brought nearer to neutrality by the addition of an alkali, say to a pH value of about 6.2 immediately after separation from the insoluble proteins and before fermentation.

I allow the egg whites to ferment for a period of about twenty to thirty hours at room temperature or above, generally about 80° to 95° F., and at the end of this period I decant the egg whites from any further insoluble flocculent material or scum which may have formed. The temperature during fermentation can vary over wide limits, from as low as 60° F. to as high, for example, as 130° F. These egg whites can then be directly dried either in spray-driers or in pan driers with or without neutralization before drying.

When hydrochloric acid is used as the acidifying agent it is not necessary to neutralize the egg whites prior to drying. During the drying operation hydrochloric acid is driven off. When other acids used in the art, such, for example, as citric, tartaric and other inorganic acids, it is advantageous to neutralize the whites prior to the drying operation.

The so-called fermentation reaction is primarily one of biological hydrolysis, and is the result of the action of either bacteria or enzymes. In the appended claims I refer to fermentation in the broader sense to include both the action of bacteria and enzymes.

The dried egg whites which I obtain by the process of the present invention are free of any fermentation odor because, as pointed out above, insoluble proteins developing such odor have been removed prior to the fermentation, together with bacterial flora growing therein. The products of my invention also have good whipping characteristics immediately after drying so that no long aging period is necessary. Thus I have been able to achieve the desirable whipping characteristics of a fermented product and at the same time entirely avoid the undesirable fermentation odor inherent in fermented egg whites prepared in the usual way.

Having thus described my invention, what I claim is:

1. In the treatment of liquid egg white the step comprising fermenting a substantially unfermented liquid egg white which is substantially free of those proteins normally occurring in egg white which are insoluble in the egg white at a pH of between about 4 and 6, and drying the fermented egg white.

2. In the treatment of liquid egg white the step comprising fermenting a substantially unfermented liquid egg white which is substantially free of those proteins normally occurring in egg white which are insoluble in the egg white at a pH of between about 5.5 and 5.8, and drying the fermented egg white.

3. The process of treating liquid egg white which includes the steps of acidifying the white to a pH of between about 4 and 6, separating the acidified white from flocculated insolubles thus formed therein prior to any substantial fermentation therein, fermenting the separated white, and drying the fermented white.

4. The process of treating liquid egg white which includes the steps of acidifying the white to a pH of between about 5.5 and 5.8, separating the acidified white from flocculated insolubles thus formed therein prior to any substantial fermentation therein, fermenting the separated white, and drying the fermented white.

5. The process as in claim 1 wherein the fermented egg white is neutralized prior to drying.

6. The process as in claim 2 wherein the egg white is neutralized prior to drying.

7. The process as in claim 3 wherein the egg white freed of flocculated insolubles is partially neutralized prior to fermenting.

8. The process as in claim 4 wherein the egg white freed of flocculated insolubles is partially neutralized prior to fermenting.

9. The process as in claim 3 wherein the fermented egg white is neutralized prior to drying.

10. The process as in claim 4 wherein the fermented egg white is neutralized prior to drying.

VERNE D. LITTLEFIELD.